United States Patent [19]

Pabla et al.

[11] Patent Number: 5,629,670

[45] Date of Patent: May 13, 1997

[54] CIRCUIT FOR INTERFACING BRAKE, TURN, AND HAZARD WARNING SIGNALS WITH ECM

[75] Inventors: Parmjit S. Pabla, Fort Wayne; Merrill D. Miller, Huntington, both of Ind.

[73] Assignee: Navistar International Transportation Corp., Chicago, Ill.

[21] Appl. No.: 622,485

[22] Filed: Mar. 26, 1996

[51] Int. Cl.$^6$ .................................................. G08B 17/12
[52] U.S. Cl. ........................ 340/479; 340/471; 340/468; 340/431; 340/475; 307/10.8
[58] Field of Search ................................. 340/468, 471, 340/475, 479; 307/10.8

[56] References Cited

PUBLICATIONS

"Electrical Circuit Diagrams" Manual No. CTS–5122S (Jan. 1995) Navistar International Transportation Corp., 1994, pp. 30, 95.

*Primary Examiner*—Jeffery Hofsass
*Assistant Examiner*—Mohammed R. Ghannam
*Attorney, Agent, or Firm*—Dennis K. Sullivan

[57] ABSTRACT

A circuit interfaces a brake switch and a combination turn signal/hazard warning signal switch with a system electronic control module (ECM). The circuit is especially useful when the vehicle has an engine idle shut-down system that requires an input for distinguishing brake application from brake non-application, wherein such an input is derived from operation of the interface circuit. The circuit also employs a relay, which, along with the brake switch, the system ECM, and the combination turn signal/hazard warning signal switch, are connected such that the brake switch carries only the relay coil load, live D.C. voltage, which is independent of the position of the vehicle's ignition switch, is fed through the relay, and a hazard warning signal is prevented from having any effect on the ECM via the relay.

18 Claims, 2 Drawing Sheets

CIRCUIT FOR INTERFACING BRAKE, TURN, AND HAZARD WARNING SIGNALS WITH ECM

FIELD OF THE INVENTION

This invention relates generally to automotive vehicle electrical circuits, and more particularly to a circuit interfacing a brake switch and a combination turn signal/hazard warning signal switch with a system electronic control module (ECM). The inventive circuit is especially useful when the vehicle has an associated system, such as an engine idle shut-down system, that requires an input for distinguishing brake application from brake non-application, wherein such an input is derived from operation of the interface circuit.

BACKGROUND AND SUMMARY OF THE INVENTION

A known truck signaling system comprises a combination turn signal/hazard warning signal switch that can be selectively operated by the driver (operator) of the vehicle to signal a right turn, to signal a left turn, or to signal a hazard warning. A common flasher is used to flash the appropriate lamps of the truck for each of the three respective signals, and it is connected in a feed to a hazard warning input terminal of the combination turn signal/hazard warning signal switch. The combination turn signal/hazard warning signal switch also has a brake (stop) input terminal to which a feed from a normally open brake (stop) switch is connected. Brake application that is concurrent with non-actuation of the combination turn signal/hazard warning signal switch will cause the rear brake (stop) lamps on both right and left sides of the vehicle to illuminate while front signal lamps that signal turn and/or hazard warning remain off. Actuation of the turn signal/hazard warning signal switch to signal a turn, concurrent with brake application, will cause the rear brake (stop) lamp(s) on the side of the vehicle toward the signaled direction of turning to flash intermittently while those rear lamp(s) toward the opposite side remain continuously illuminated. Actuation of the combination turn signal/hazard warning signal switch to signal a hazard warning will, in the absence of brake application, cause the rear brake (stop) lamp(s) toward both sides of the vehicle, and other lamps that signal hazard warning, to flash intermittently; however, should the brakes be concurrently applied, the rear brake lamps on both sides will continuously illuminate as well as the remaining lamps, because the closed brake switch shorts out the flasher.

A known system ECM for a truck comprises two inputs for determining if the brakes are being applied by the driver. One input is sometimes referred to as "brake normally open" input, and the other, as "brake normally closed" input. These two inputs are intended to receive respective binary logic level signals, which are supplied from a D.C. voltage source (typically the vehicle electrical power supply) via a normally open switch and via a normally closed switch respectively. When the brakes are not being applied, the "brake normally open" input receives no voltage (corresponding to low logic level), while the "brake normally closed" input receives live D.C. voltage (corresponding to high logic level). When the brakes are being applied, the "brake normally open" input receives live D.C. voltage, while the "brake normally closed" input receives no voltage.

A truck engine, such as in a heavy truck, may have what is known as an "idle shut-down" system. Such an "idle shut-down" system is effective to automatically shut down the engine if the brakes are not applied, the accelerator pedal is not depressed, and/or the transmission is not in gear for a predetermined amount of time, five minutes for example. Integration of an idle shut-down system with the aforementioned system ECM in a vehicle having the aforementioned turn signal/hazard warning system must assure that there is no undesired interaction between these systems, and it is toward this objective that the present invention is directed.

One aspect of the present invention relates to a new and unique circuit for interfacing a brake switch and a combination turn signal/hazard warning signal switch with a system electronic control module, particularly where an associated system, such as an idle shut-down system, obtains a brake signal input from the circuit, so that no undesired electrical interactions, like spurious feedback paths for example, occur. A presently preferred embodiment of the invention employs known system components but connects them in a new and unique cooperative association to achieve the desired objective.

The foregoing, along with further features and advantages of the invention, will be seen in the following disclosure of a presently preferred embodiment of the invention depicting the best mode contemplated at this time for carrying out the invention. The disclosure includes drawings, as now briefly described.

DESCRIPTION OF THE PREFERRED EMBODIMENTS

Figure 1A:
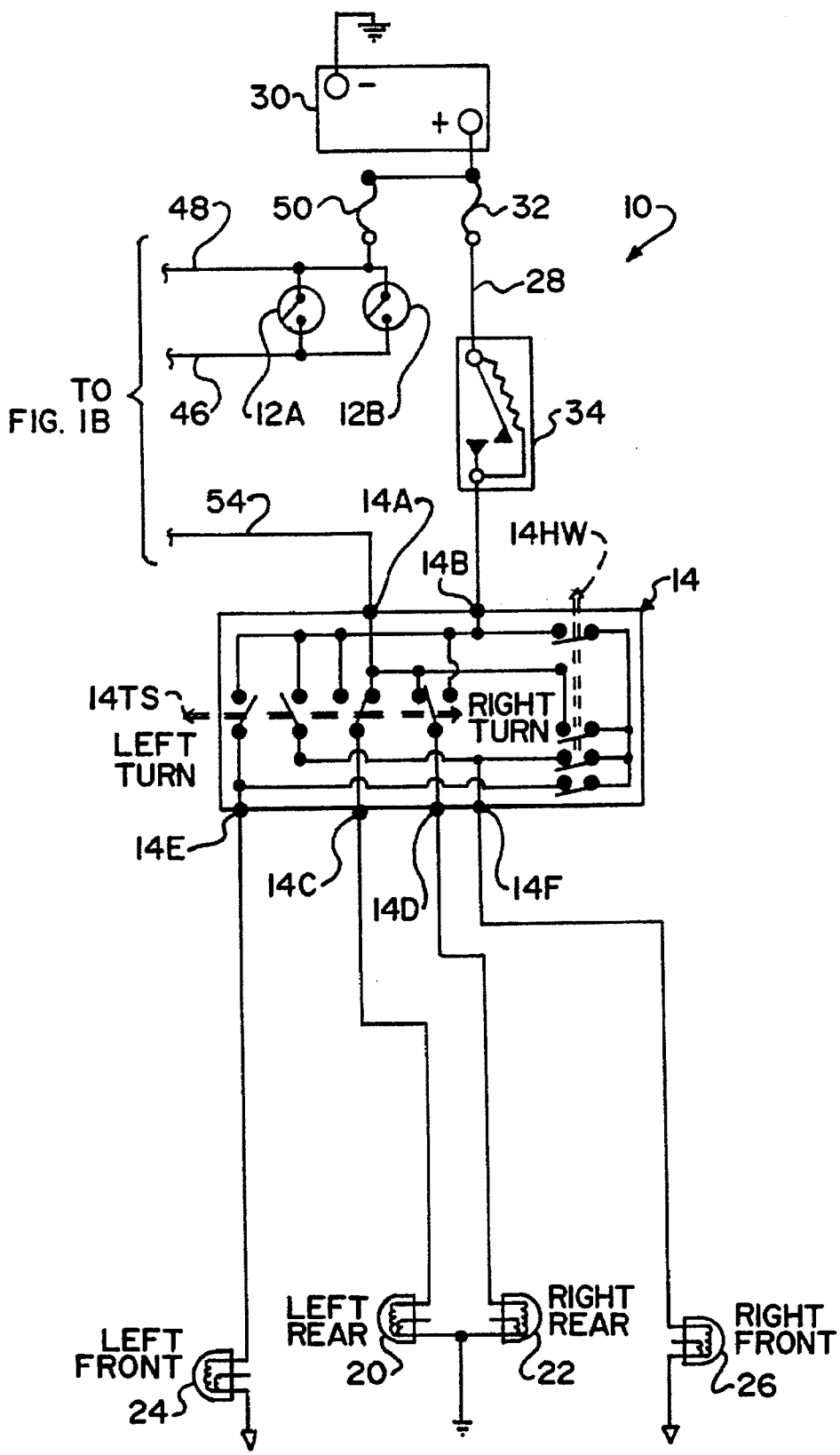
FIGS. 1A and 1B taken together are an electrical schematic diagram of relevant portions of a truck electrical system embodying principles of the present invention.
Figure 1B:
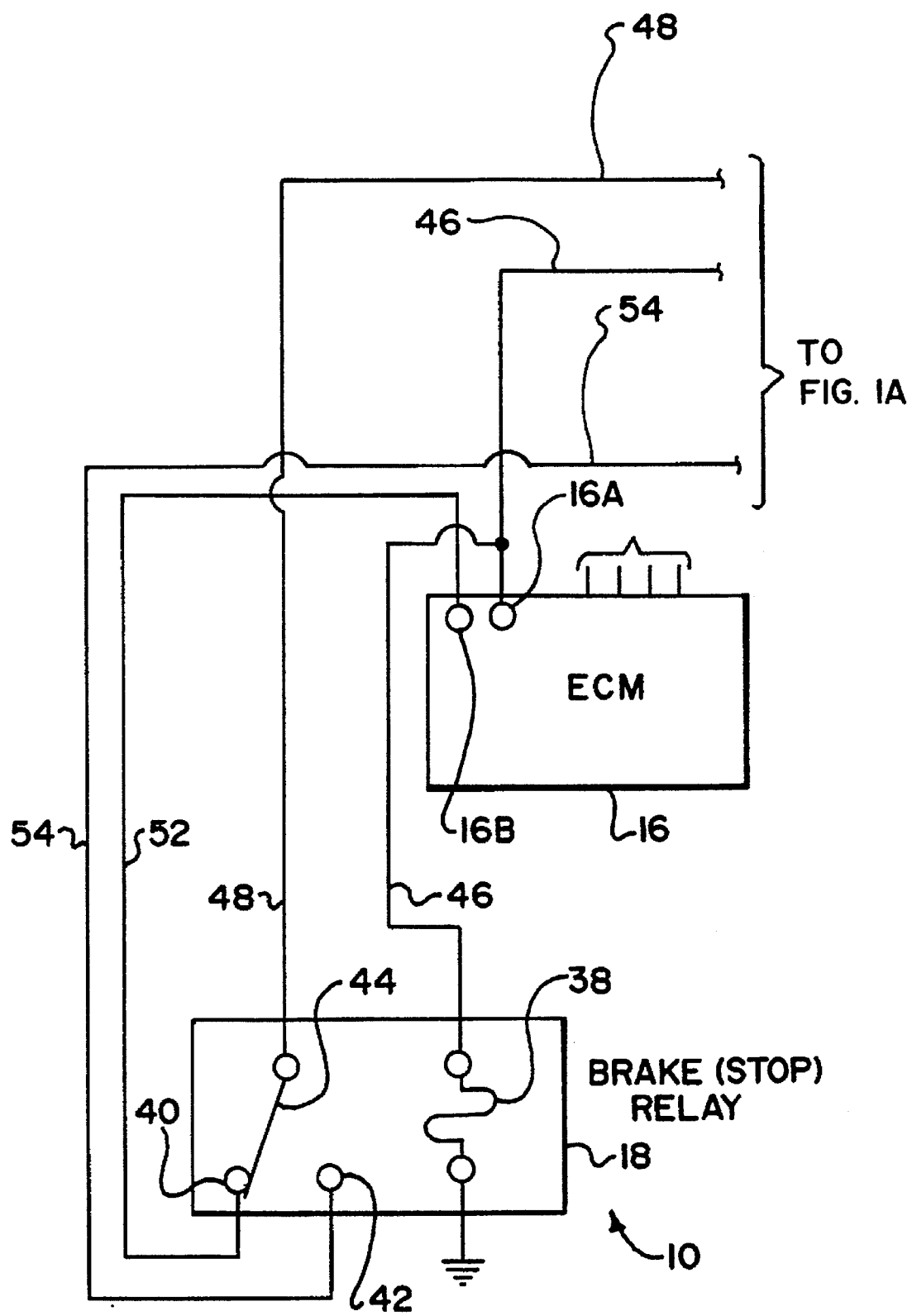

FIGS. 1A and 1B show an embodiment of the inventive circuit 10 for a brake system of an automotive vehicle that operates vehicle brakes in response to brake application by a driver (operator) of the vehicle and for a signaling system of the vehicle that gives brake application, right turn, left turn, and hazard warning signals.

Circuit 10 comprises: two (for deliberate redundancy) normally open brake (stop) switches 12A, 12B connected in parallel; a combination turn signal/hazard warning switch 14; a brake ECM 16; and an electromechanical brake (stop) relay 18.

Combination turn signal/hazard warning switch 14 comprises a turn signal/brake input terminal 14A, a hazard warning input terminal 14B, a left rear lamp output terminal 14C, a right rear lamp output terminal 14D, a left front lamp output terminal 14E, and a right front lamp output terminal 14F. A left rear lamp load 20 is connected to terminal 14C, a right rear lamp load 22 is connected to terminal 14D, a left front lamp load 24 is connected to terminal 14E, and a right front lamp load 26 is connected to terminal 14F.

A feed 28 connects an ungrounded terminal of the vehicle's D.C. power supply 30 to terminal 14B, and comprises an in-line current overload protection device 32 and a flasher 34.

Combination turn signal/hazard warning switch 14 further comprises a hazard warning switch portion 14HW and a turn signal switch portion 14TS. The internal construction of switch 14 provides electric continuity from terminal 14B to switch portion 14HW and to certain contacts of switch portion 14TS. The internal construction of switch 14 also provides electric continuity from terminal 14A to certain other contacts of switch portion 14TS. As will be explained in fuller detail later on, the normally open condition of switches 12A and 12B provides no voltage to terminal 14A when the brakes are not being applied, but voltage of the ungrounded terminal of power supply 32 is delivered to terminal 14A when the brakes are being applied, closing switches 12A and 12B. FIG. 1 depicts the condition where switch 14 is giving neither a hazard warning nor either turn signal.

Turn signal switch portion 14TS is selectively operable by the driver of the vehicle for giving right and left turn signals, the right turn signal being given by connecting terminals 14D and 14F to terminal 14B to cause the lamp loads 22, 26 toward the right side of the vehicle to be flashed by flasher 34, and the left turn signal being given by connecting terminals 14C and 14E to terminal 14B to cause the lamp loads 20, 24 toward the left side of the vehicle to be flashed by flasher 34. Should the brakes be applied concurrent with operation of turn signal switch portion 14TS to either right turn or left turn condition, the resulting continuous application of voltage from power supply 30 to terminal 14A is delivered via switch 14 only to the rear lamp load on the side opposite the side being flashed. Operation of hazard warning switch portion 14HW alone causes all lamp loads 20, 22, 24, 26 connected to terminals 14C, 14D, 14E, and 14F to flash, but if the brakes are applied at the same time, the right and left front lamp loads 24, 26 and the right and left rear lamp loads 20, 22 will continuously illuminate.

Relay 18 comprises an operating coil 38, a first fixed contact 40, a second fixed contact 42, and a movable contact 44 that is operated by coil 38 to selectively establish contact with contacts 40, 42. FIG. 1B shows relay 18 in a first condition where coil 38 is not being energized causing movable contact 44 to make contact with fixed contact 40 but not with fixed contact 42. When coil 38 is energized, the relay operates to a second condition where movable contact 44 is making contact with fixed contact 42 but not with fixed contact 40. Thus, contacts 40 and 44 form a first controlled conductivity path through relay 18 while contacts 42 and 44 form a second controlled conductivity path through the relay.

Relay 18 is in essence a switch that is slaved to switches 12A, 12B. A feed 46 connects the load side of switches 12A, 12B to one termination of coil 38 while the other coil termination is grounded. A feed 48, that includes an in-line current overload protection device 50, connects the supply side of switches 12A, 12B to the ungrounded terminal of power supply 30. Hence, closure of either normally open switch 12A, 12B is effective to energize coil 38, causing relay 18 to operate to its second condition; and when both switches 12A, 12B are open, the coil is de-energized, and the relay reverts to its first condition.

Feed 46 also connects to a "brake normally open" input 16A of brake ECM 16 to supply to that input a binary logic signal level that is high when either switch 12A, 12B is closed, and low when both switches are open. ECM 16 also has a "brake normally closed" input 16B. A feed 52 from relay fixed contact 40 connects to input 16B, and feed 48 also connects to movable contact 44. Thus, when relay 18 is in its first condition (brakes not applied so that switches 12A, 12B are both open), the continuity provided by the aforementioned first controlled conductivity path through the relay causes power supply voltage to be delivered to input 16B of ECM 16 to supply that input with a high binary logic signal level. When relay 18 is in its second condition (brakes applied so that switches 12A, 12B are both closed), the continuity through the relay's first controlled conductivity path is interrupted to cause no power supply voltage to be delivered to input 16B thereby supplying that input with a low binary logic signal level. Therefore, feed 52 enables input 16B of ECM 16 to sense which one of the first and second conditions relay 18 is being operated to, and circuit 10 assures that the logic level signal delivered to one of the two inputs 16A, 16B will always be the complement delivered to the other. (Any overlap in the respective logic signal levels, such as may occur for a few milliseconds during switching between levels, is ignored by ECM 16, but if overlap exists for a longer time, ECM 16 indicates a fault).

Circuit 10 further comprises a feed 54 from second fixed contact 42 of relay 18 to terminal 14A of switch 14. When relay 18 is in its first operating condition, the continuity through the relay's second controlled conductivity path is interrupted to cause no power supply voltage to be delivered to terminal 14A. When relay 18 is in its second operating condition, continuity through the relay's second controlled conductivity path is established to cause power supply voltage to be delivered to terminal 14A. Feed 54 enables a stop signal to be given by both rear lamp loads 20, 22 when no turn signal is being given by switch 14. When a turn signal is being given, the rear lamp load opposite the direction of turn being signaled is enabled to give a stop signal.

In operation, circuit 10 performs the important functions of feeding live D.C. voltage through relay 18 which is independent of the position of the vehicle's ignition switch, and of preventing a hazard warning signal from having any effect on input 16B of ECM 16 via relay 18. It allows the hazard warning signal to also be given regardless of ignition switch position. A further advantage is that switches 12A, 12B have to carry only the current load imposed by relay coil 38.

While a presently preferred embodiment of the invention has been illustrated and described, it should be appreciated that principles of the invention are applicable to all embodiments that fall within the scope of the following claims.

What is claimed is:

1. An electric circuit interfacing a brake system of an automotive vehicle that operates vehicle brakes in response to brake application by an operator of the vehicle with both a signaling system of the vehicle that gives brake application, right turn, left turn, and hazard warning signals, and with an electronic control module of the vehicle, said electric circuit comprising in combination:

an electronic control module comprising first and second inputs;

a signaling system that gives brake application, right turn, left turn, and hazard warning signals;

brake switch means that serves both said electronic control module and said signaling system and that is selectively operable to give respective brake non-application and brake application signals;

a first feed from said brake switch means to said first input of said electronic control module for enabling said first input of said electronic control module to sense which of said brake application and brake non-application signals is being given by said brake switch means;

slave switch means slaved to said brake switch means to be selectively operable to first and-Second switch conditions corresponding respectively to said brake switch means giving a brake non-application signal and a brake application signal respectively, said slave switch means comprising first and second controlled conductivity paths which are selectively operable to respective first and second conductivity conditions corresponding respectively to the first and second switch conditions of said slave switch means respectively;

a second feed from said first controlled conductivity path of said slave switch means to said second input of said electronic control module for enabling said second input of said electronic control module to sense the one of said first and second switch conditions to which said slave switch means is being operated;

and a third feed from said second controlled conductivity path of said slave switch means to said signaling system that, when said slave switch means is operated to its second switch condition by said brake switch means, enables said signaling system to give a stop signal, and that, when said slave switch means is operated to its first conductivity condition, prevents the hazard warning signal from having any effect on said second input of said electronic control module via said slave switch means.

2. An electric circuit as set forth in claim 1 in which said slave switch means comprises an electromechanical relay having a coil via which the relay is slaved to said brake switch means.

3. An electric circuit as set forth in claim 2 in which said relay comprises a first fixed contact, a second fixed contact, and a movable contact that is operated by said coil to selectively establish contact with said first and second fixed contacts such that when said slave switch means is in its first switch condition, said movable contact is making contact with said first fixed contact and not with said second fixed contact, and when said slave switch means is in its second switch condition, said movable contact is making contact with said second fixed contact and not with said first fixed contact, wherein said first controlled conductivity path comprises said movable contact and said first fixed contact, and said second controlled conductivity path comprises said movable contact and said second fixed contact.

4. An electric circuit as set forth in claim 3 further including a fourth feed for feeding live D.C. voltage to said fixed contact of said relay independent of the position of an ignition switch of the vehicle.

5. An electric circuit as set forth in claim 4 in which said fourth feed comprises an in-line current overload protection device.

6. An electric circuit as set forth in claim 5 further including a fifth feed for feeding live D.C. voltage through said in-line current overload protection device to said brake switch means.

7. An electric circuit as set forth in claim 6 in which said brake switch means is selectively operable to an open condition when said brake switch means is giving the brake non-application signal, and to a closed position when said brake switch means is giving the brake application signal, and further including a sixth feed from said brake switch means to said relay coil for causing said coil to be energized when said brake switch means is in closed condition.

8. An electric circuit as set forth in claim 7 in which said signaling system comprises a combination turn signal/hazard warning switch that is selectively operable by the vehicle operator for giving right turn, left turn, and hazard warning signals, said combination turn signal/hazard warning switch comprising a turn signal/brake input terminal and a hazard warning input terminal, said third feed connects to said turn signal/brake input terminal, and further including a seventh feed for feeding live D.C. voltage to said hazard warning input terminal, said seventh feed comprising a flasher and an in-line current overload protection device.

9. An electric circuit as set forth in claim 2 in which said signaling system comprises a combination turn signal/hazard warning switch that is selectively operable by the vehicle operator for giving right turn, left turn, and hazard warning signals, said combination turn signal/hazard warning switch comprising a turn signal/brake input terminal and a hazard warning input terminal, said third feed connects to said turn signal/brake input terminal, and further including a fourth feed connected to said hazard warning input terminal and comprising a flasher and an inline current overload protection device.

10. An electric circuit as set forth in claim 1 in which said slave switch means comprises an electromechanical relay having a selectively energizable coil, a fourth feed from said brake switch means to said coil for slaving said coil to said brake switch means, and said relay comprising contact means operated by said coil for selectively operating said first and second controlled conductivity paths to their first and second conductivity conditions.

11. An electric circuit as set forth in claim 10 in which said relay contact means comprises a first fixed contact, a second fixed contact, and a movable contact that is operated by said coil to selectively establish contact with said first and second fixed contacts such that when said coil is not energized, said slave switch means is in its first switch condition to cause said movable contact to make contact with said first fixed contact and not with said second fixed contact, and such that when said coil is energized, said slave switch means is in its second switch condition to cause said movable contact to make contact with said second fixed contact and not with said first fixed contact, wherein said first controlled conductivity path comprises said movable contact and said first fixed contact, and said second controlled conductivity path comprises said movable contact and said second fixed contact.

12. An electric circuit as set forth in claim 11 in which said brake switch means is selectively operable to an open condition when giving the brake non-application signal, and to a closed condition when giving the brake application signal, and further including a fifth feed from said brake switch means to said relay coil for causing said coil to be energized when said brake switch means is in closed condition.

13. An electric circuit as set forth in claim 12 in which said signaling system comprises a combination turn signal/hazard warning switch that is selectively operable by the vehicle operator for giving right turn, left turn, and hazard warning signals, said combination turn signal/hazard warning switch comprising a turn signal/brake input terminal and a hazard warning input terminal, said third feed connects to said turn signal/brake input terminal, and further including a fifth feed connected to said hazard warning input terminal and comprising a flasher and an inline current overload protection device for providing live intermittent D.C. voltage to said hazard warning input terminal when said hazard warning signal is being given.

14. An electric circuit as set forth in claim 13 further including a sixth feed for feeding live D.C. voltage to said fixed contact of said relay independent of the position of an ignition switch of the vehicle.

15. An electric circuit as set forth in claim 14 in which said sixth feed comprises an in-line current overload protection device.

16. An electric circuit as set forth in claim 1 in which said brake switch means provides to said first input of said electronic control module, via said first feed, a first binary logic signal having respective binary logic levels corresponding to the brake non-application signal and the brake application signal respectively, said slave switch means provides to said second input of said electronic control module, via said second feed, a second binary logic signal having respective binary logic levels corresponding to the first and second switch conditions of said slave switch means, and the binary logic level of said first binary logic signal is opposite the binary logic level of said second binary logic signal when said slave switch means is in its first switch condition and is opposite the binary logic level of said second binary logic signal when said slave switch means is in its second switch condition.

17. An electric circuit as set forth in claim 1 further including a further vehicle system that requires an input for distinguishing between brake application and non-application, and said further vehicle system input is derived from operation of said electric circuit.

18. An electric circuit as set forth in claim 17 in which said further vehicle system is an idle shut-down system for an engine of the vehicle.

* * * * *